E. A. HURTLEY.
MINING AND TUNNEL SHOVELING MACHINE.
APPLICATION FILED DEC. 14, 1916. RENEWED MAR. 20, 1919.

1,319,220.

Patented Oct. 21, 1919.
8 SHEETS—SHEET 1.

E. A. HURTLEY.
MINING AND TUNNEL SHOVELING MACHINE.
APPLICATION FILED DEC. 14, 1916. RENEWED MAR. 20, 1919.

1,319,220.

Patented Oct. 21, 1919
8 SHEETS—SHEET 3.

E. A. HURTLEY.
MINING AND TUNNEL SHOVELING MACHINE.
APPLICATION FILED DEC. 14, 1916. RENEWED MAR. 20, 1919.

1,319,220.

Patented Oct. 21, 1919.
8 SHEETS—SHEET 6.

UNITED STATES PATENT OFFICE.

EMIL A. HURTLEY, OF NEGAUNEE, MICHIGAN, ASSIGNOR TO R. S. WALKER, OF DULUTH, MINNESOTA.

MINING AND TUNNEL SHOVELING MACHINE.

1,319,220.  Specification of Letters Patent.  Patented Oct. 21, 1919.

Application filed December 14, 1916, Serial No. 136,999. Renewed March 20, 1919. Serial No. 283,846.

*To all whom it may concern:*

Be it known that I, EMIL A. HURTLEY, a citizen of the United States, residing at Negaunee, in the county of Marquette and State of Michigan, have invented certain new and useful Improvements in Mining and Tunnel Shoveling Machines; and I do hereby declare the following to be a full, clear, and exact description of the invention, such as will enable others skilled in the art to which it appertains to make and use the same.

This invention relates to new and useful improvements in mining and tunnel shoveling machines and the principal object of the invention is to provide a device which will shovel and convey material back over its frame and deposit the same within a car arranged at the rear of the device.

Another object of the invention is to provide a device which may be used on a curved track and is arranged so that the rearmost conveyer may be swung laterally in order that the rear end thereof may be centered over the car into which the material is deposited.

Still another object of this invention resides in the provision of a novel form of shovel and supporting mechanism therefor which gives the shovel a powerful digging stroke so that the shovel may be forced into relatively hard ground or earth in order to loosen the same.

A further object of the invention resides in the provision of a device which may be propelled about a mine or tunnel under its own power and which is so arranged that the speed may be varied in order that the machine may be readily handled.

A still further object of the invention is to provide a device having the rear end of the rearmost conveyer vertically adjustable in order that the same may be raised or lowered to accommodate cars of various heights.

As another object the invention contemplates the provision of a turntable on the supporting truck of the device so that the same may be swung around and operated in various positions.

The invention further resides in the provision of a novel anchoring means for the device by which it is clamped to the track rails and also a provision of a means for supporting the same against lateral tilt, which latter means may be moved into an inoperative position to avoid engaging obstacles when the device is being moved about a mine.

With these and other objects in view the invention consists in the novel combination and arrangements of parts which will be fully set forth in the following specification and accompanying drawings, in which:—

Fig. 11 is a detail view partly in section of the driving mechanism for the rear conveyer.

Fig. 14 is an enlarged vertical sectional view on line 14—14 of Fig. 13, Referring to the drawings 1 designates the main frame of the device comprising the side bars 2 arranged in spaced parallel relation and connected by the end bars 3. These side bars are connected intermediate their ends by suitable bolsters which are arranged in pairs near opposite ends of the device and are adapted to be swivelly connected centrally to suitable bolsters 4 of the front and rear trucks. The opposite ends of the bolsters 4 are connected to the truck frames 5 having mounted therein the journal bearings 6 through which the axles of the supporting wheels 7 extend. The adjacent wheels designated by the numeral 7ª are the drive wheels of the device and are mounted on their respective drive axles 8 and 9 which in turn have mounted thereon the gear wheels 10 and 11 respectively forming a driving means for the axles. The side bars 2 of the frame 1 are each provided with parallel extending side bars 12 which are spaced outwardly therefrom for a short distance and extend substantially two thirds of the entire length of said bars as clearly shown in the drawings. Connected to the end bars of the frame 1 are suitable longitudinally extending bars 13 which are arranged in spaced parallel relation between the side bars 2 and these bars 13 have attached to one end suitable yokes 14 in which the I-beams 15 and 16 are slidably mounted. These I-beams slide transversely of the forward end of the frame 1 and are adapted to have suitable jacks 17 placed underneath their outer ends when the machine is in use in order to prevent the same from raising one side or the other from the track. The wheels 7 and 7ª are, of course, flanged to run on suitable track rails 18 as clearly illustrated in Figs. 1, 5 and 6. Secured centrally of the truck frame and extending transversely between the central pair of bars 13 is a pair of supporting bars 19 which support suitable bearings in which the shaft 20 is journaled. This shaft 20 supports centrally a sprocket wheel 21 and is provided at opposite ends with universal joints 22 to which the telescopic shafts 23 are connected. The opposite ends of these shafts are connected to universal joints 24 which are positioned at one end of suitable stub shafts 25, which are rotatably mounted in a pair of U-shaped yokes 26 which are rotatably supported on the axles 8 and 9, and the ends of the shafts 25 opposite those provided with the universal joints 24 are provided with suitable bevel pinions 27, which mesh with the gears 10 and 11. It will thus be seen that when power is transmitted to the sprocket 21 the telescopic shafts 23 will rotate the pinion 27 thereby driving the axles 8 and 9 and when the machine rounds a curve it will be seen that the sleeve shafts 23 and the yokes 26 will allow the pinions 27 and the gears 10 and 11 to mesh at all times and the sleeve shafts will allow the distance between the universal joints 24 to vary without disconnecting the drive wheels.

Attached to the side bars 2 adjacent their rear ends and on their undersides are suitable eyes 28 having the links 30 pass therethrough, which links support the inverted V-shaped clamp arms 31, the lower ends of which are provided with inturned hooks 32 for engagement beneath the head of the rail. A suitable ring or sleeve 33 is slidable on the arms 31 and is arranged so that when slid downwardly toward the hooked ends 32, the arms will be moved toward each other in order to firmly clamp the rail to prevent the rear end of the machine from lifting upwardly when the device is in operation.

Secured between the centermost bars 13 of the frame 1 is a suitable plate which is apertured to receive the lower end of the pivot pin 34 of the turntable designated generally by the numeral 35. This turntable is provided with a flange 36 which is adapted to run on suitable bearing balls 37 arranged on a circular track 38 which is secured to the top of the frame 1 as clearly shown in the drawings. Secured to the frame at spaced intervals is a plurality of segmental transversely L-shaped brackets 39 which are adapted to overlie the upper side of the flange 36 in order to hold the device firmly in place and prevent it from tilting when in use. Secured to the upper side of the turntable 35 is the platform 40 on which the operating mechanism for the shovel is mounted. Secured to the underside of the frame 1 is an arcuate rack bar 41, the teeth of which are adapted to mesh with the pinion 42 which is mounted at the lower end of the vertical shaft 43, which shaft extends upwardly through the turntable and platform and is provided at its upper end with a worm gear 44 which meshes with the worm 45 mounted on the drive shaft 46, the opposite end of which is provided with a bevel gear 47 meshing with the bevel gears 48 which are loosely mounted on the shaft 49 which in turn is journaled in suitable bearings on the upper side of the platform 40 and is provided with a suitable clutch member 50 which is splined to said shaft and arranged so as to be moved into engagement with either of the gears 48 whereby the direction of rotation of the shaft 46 may be controlled.

Mounted on the platform 40 is a suitable motor 51, the shaft 52 of which is provided with a suitable sprocket around which the chain 53 runs. This chain passes over a sprocket mounted on the main drive shaft 54 which in turn is rotatably mounted transversely of the platform in suitable brackets and has loosely mounted thereon suitable gears 55 and 56 each of which is provided with a clutch member 57 by means of which its rotation is controlled. Mounted on the shaft 54 adjacent the end opposite that on which the drive sprocket is mounted is a suitable sprocket over which the chain 58 passes which chain in turn passes over a suitable sprocket mounted on the shaft 59 which is mounted directly beneath the drum shaft 60. A herring bone pinion is mounted on the shaft 59 and meshes with a herring bone gear 61 mounted on the shaft 60 and it will thus be seen that when the shaft 59 is rotated the gear will also be rotated. A suitable clutch member 62 is connected to the gear for driving the shaft 60 and mounted at opposite ends of the shaft 60 are suitable winding drums 63 on which the bucket cables are wound. Mounted on the shaft 54 intermediate the gear 56 and the sprocket of the chain 58 is a suitable sprocket around which the chain 64 passes which chain extends forwardly and around a sprocket mounted on the shaft 65 which in turn has loosely mounted thereon the bevel gears 66 and 67. Each of these gears is provided with a clutch member 68 and they both mesh with a pinion 69 mounted on the rear end of a longitudinally extending counter shaft 70, intermediate the ends of which is mounted a suitable worm 71. This worm meshes with and drives the worm wheel 72 which is mounted centrally of the drive shaft 73 of the shovel, the ends of which carry suitable pinions 74 which mesh with the racks within the shovel controlling arms to be more fully hereinafter described.

Figures 2, 12, 13:
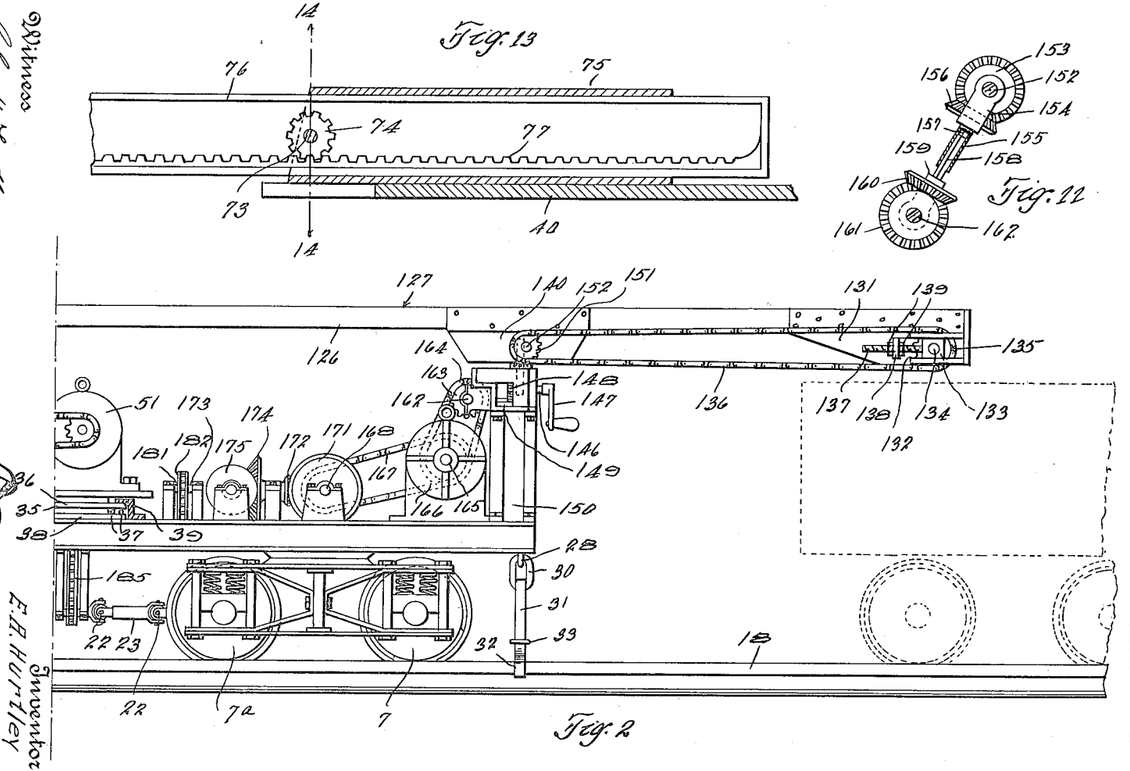
Fig. 2 is a fragmentary side view of the rear end of the machine.
Fig. 12 is an enlarged detail view showing the driving mechanism for the truck propelling gears, said view being taken on line 12—12 of Fig. 7.
Fig. 13 is an enlarged longitudinal sectional view through one of the shovel arms and the guide therefor.
Figure 14:
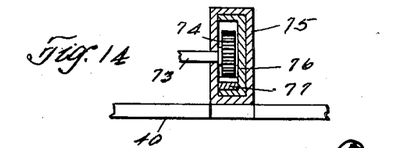

As shown in Figs. 13 and 14 a pair of channel guides 75 are pivotally mounted on the ends of the shaft 73 in such a manner that the pinions 74 are mounted between the flanges of said bars and slidable within said channel guides are suitable channel bars 76 forming the arms for supporting the shovel. The channel bars 76 are disposed so that their flanges extend toward the bight portions of the channel guides 75 and thus completely house the pinions 74 as will be clearly seen upon reference to Fig. 14. Secured to the bottom flange of each of the channel bars 76 is a rack bar 77 which meshes with its respective pinion 74 and it will thus be seen that when said pinion is rotated the channel bar 76 will be moved according to the direction of rotation of the pinion. In order that the direction of rotation of the pinion may be reversed, the clutches 68 are provided and it will be seen that when the gear wheel 66 is driven by the shaft 65 the pinions 74 will be rotated in such a direction as to move the arms 76 rearwardly, but when the gear wheel 67 is driven it will be seen that the arms will move in the opposite direction. In order to swing the shovel downwardly on its forward movement, suitable arcuate rack bars 78 are attached to the rear ends of the guide channels 75 and each of these rack bars meshes with a pinion 79 mounted on a shaft 80 which is rotatably mounted above and in the rear of the shafts 54 and 65. This shaft 80 carries a worm gear 81 which meshes with a worm mounted therebeneath which in turn is driven by a bevel pinion 82 which meshes with the gears 55 and 56 hereinbefore referred to. It will thus be seen that when the clutch 57 of the gear 55 is thrown into operation the pinion 82 will be driven thus causing the worm gear 81 to rotate and drive the shaft 80 which in turn causes the pinion 79 to rotate and thus raise the rear ends of the guides so that upon the forward movement of the shovel the same will have a digging action. Upon throwing out the clutch 57 of the gear 55 and throwing in the clutch 57 of the gear 56 it will be seen that the direction of rotation of the shaft 81 will be reversed, thus causing the wheels 79 to rotate to move the guides to original position.

Figure 1:
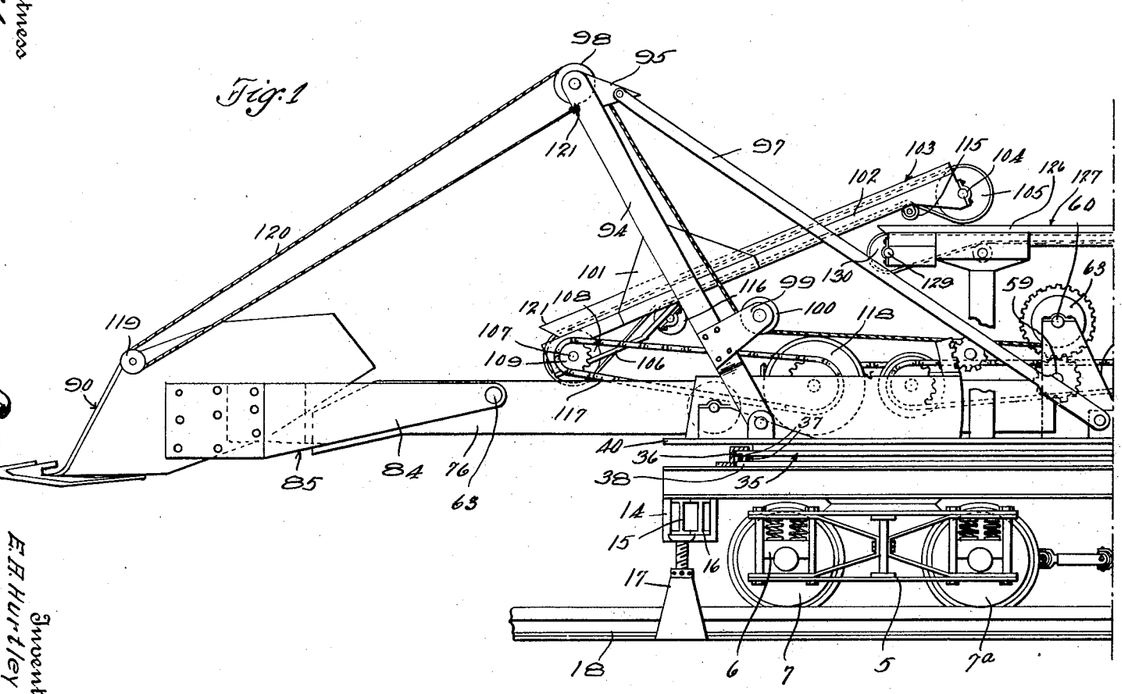
Figure 1 is a fragmentary side view of the front end of the mining and tunnel shoveling machine.
Figure 3:
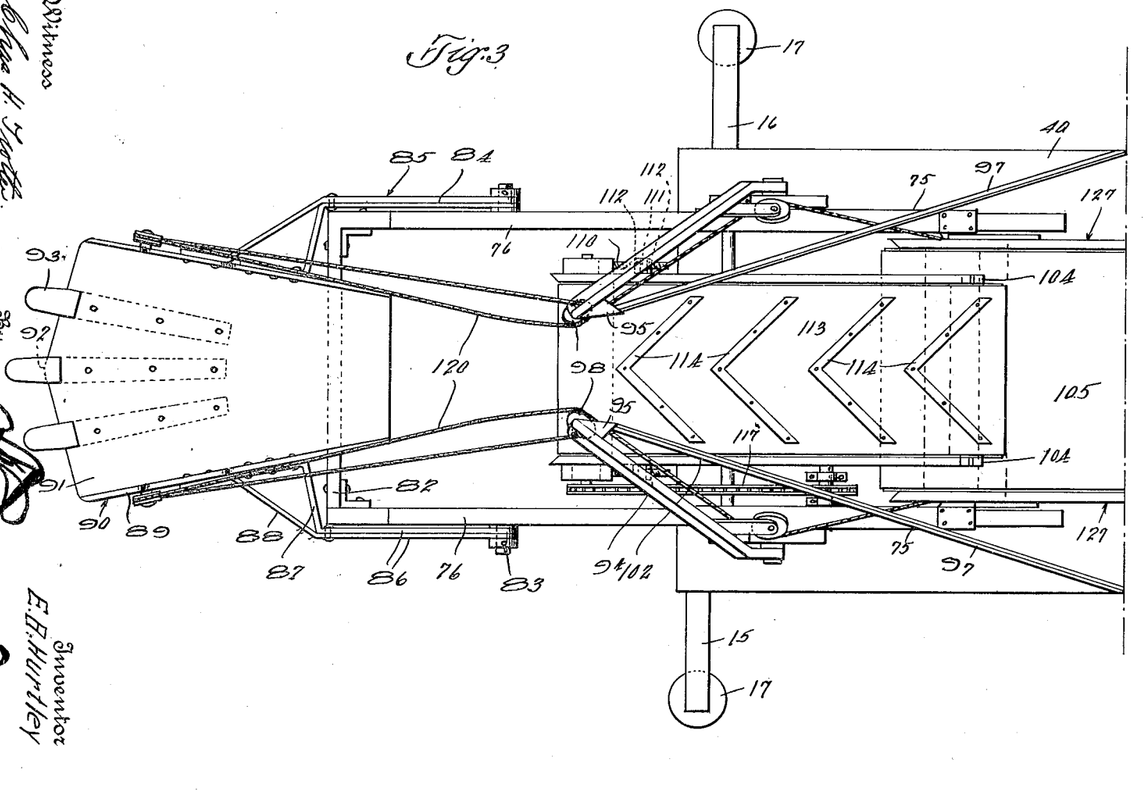
Fig. 3 is a top plan view of the forward end of the machine.
Figure 4:
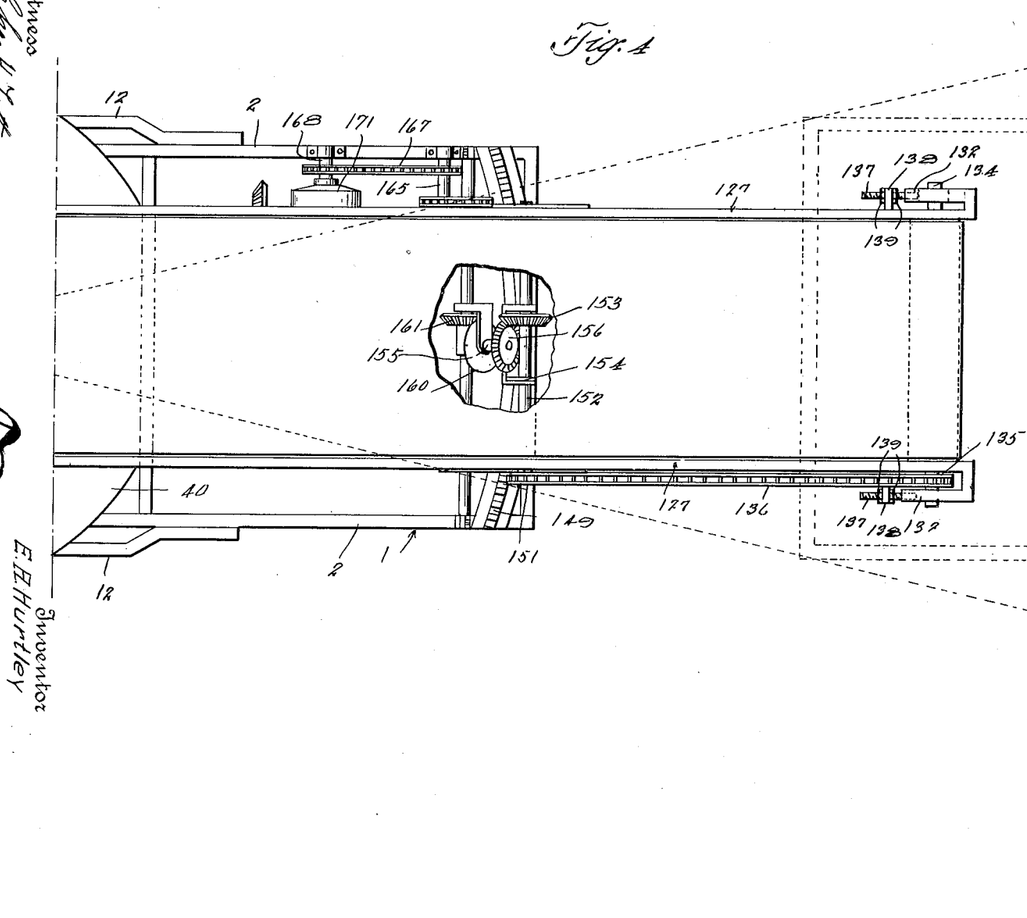
Fig. 4 is a top plan view of the rear end of the machine showing a portion of the rear conveyer broken away to more clearly illustrate the operating mechanism thereof.
Figure 5:
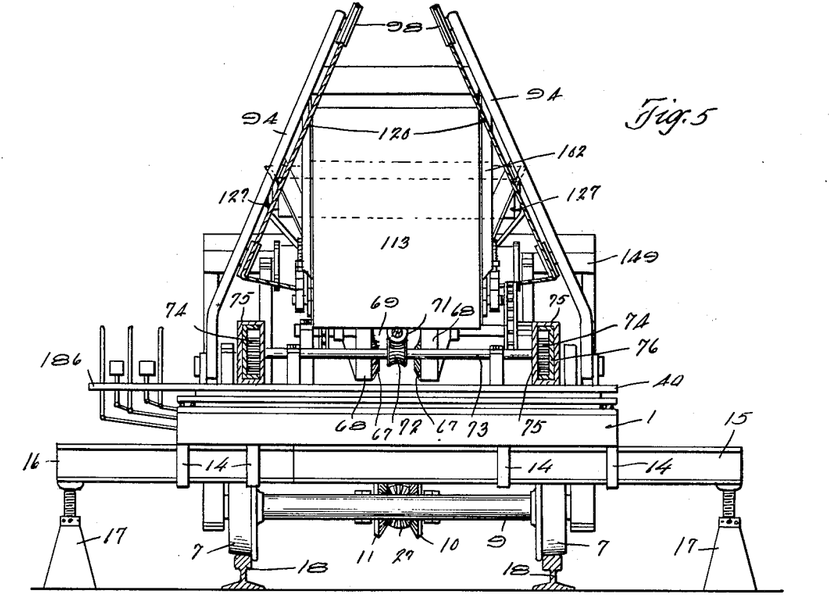
Fig. 5 is a front end elevation of the machine showing the shovel removed and illustrating the arms of said shovel in section.
Figure 6:
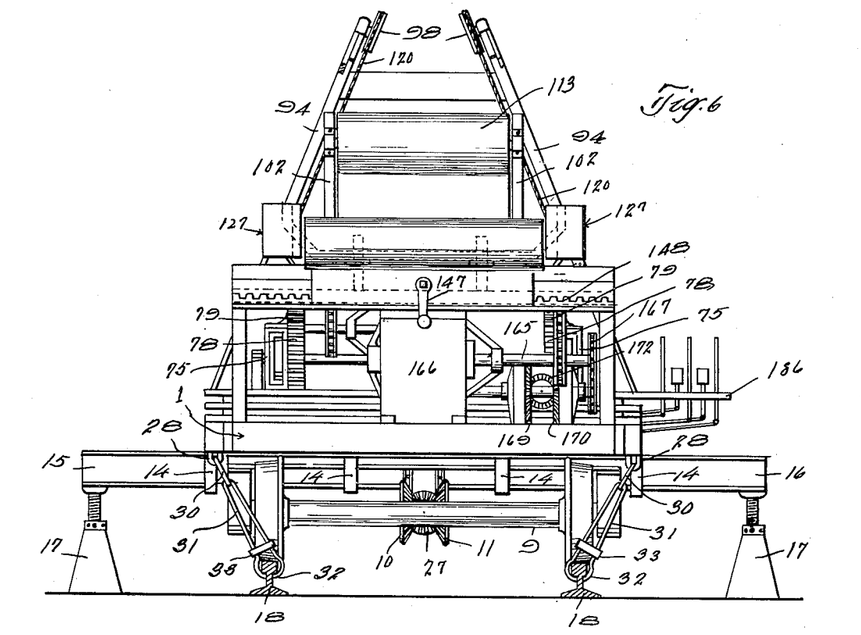
Fig. 6 is a rear end elevation of the machine illustrating in detail the method of anchoring the device to the track and also showing the means for preventing the lateral tilt when the device is swung to one side or the other.

The forward ends of the arms are connected by a transversely extending bar 82 so that the forward ends of said bars 76 will be held in spaced relation. The channel bars 76 are provided intermediate their ends with outwardly extending studs 83 on which are pivotally mounted the arms 84 of the bucket bail designated generally by the numeral 85. This bucket or scoop bail consists of a pair of bars 86 which are attached together and the ends of said bars 86 are bent inwardly as at 87 and 88 and riveted as shown in Fig. 3 to the side flanges 89 of the bucket or scoop designated generally by the numeral 90. This bucket or scoop comprises the bottom 91 which tapers toward its rear end and is pointed as at 92 and the side edges of said bucket are bent up to provide the flanges 89 as clearly shown in the drawings. Riveted or otherwise rigidly connected to the forward edge of the bucket or scoop is a plurality of teeth or fingers 93 which are arranged to provide digging fingers to facilitate the entrance of the bucket into the wall on which the machine is operating. As shown in Fig. 1 the bottom 91 of the bucket is substantially arcuate so that the slight tilting action of the same when raised between its shoveling and dumping positions will avoid the possibility of the material from falling out of the bucket until it has reached dumping position.

Extending upwardly and forwardly from a point near the forward end of the turntable and platform 40 is a pair of supporting arms 94, the upper ends of which have attached thereto suitable connecting plates 95 to which the upper ends of the brace rods 97 are connected. The opposite terminals of said brace rods are connected to the platform at a point slightly in the rear of the pivot and mounted on the arms at their upper forward ends are suitable sheaves 98 over which the bucket controlling cables pass. Attached to the arms near the point where they are connected to the platform are suitable brackets 99 which support the sheaves 100 which act as guides for the cable in order to properly guide the same on to the winding drums 63 hereinbefore described. A suitable substantially triangular supporting plate 101 is secured to each of the arms and attached to each plate is one side bar 102 of the forward conveyer designated generally by the numeral 103. This conveyer comprises the side bars previously described having mounted at their rear ends a suitable shaft 104 on which a roller 105 is mounted, while the forward end of said conveyer frame carries a pair of brackets 106 in which is slidably mounted a shaft 107 carrying the forward conveyer roller 108 and a suitable sprocket 109. The bearings for the shaft 107 are provided with suitable threaded stems 110 which pass through eyes 111 and have threaded thereon suitable nuts 112 which are adapted to engage the eyes in order to hold the device in various adjusted positions. The rollers 105 and 108 form guides over which the conveyer belt 113 passes and this belt is provided with suitable flexible flights 114 which serve to carry the material upwardly and prevent any possibility of the same falling from the conveyer. A suitable idler roller 115 is arranged to engage the belt at a point slightly forwardly of the roller 105 and this idler roller 115 holds the under run of the belt upwardly in the manner illustrated in Fig. 1. A similar idler roller 116 is attached to the frames 106 and coöperates with the roller 115 in holding the under run of the belt against sagging. The sprocket 109 is driven by a suitable chain 117 which passes rearwardly and over a sprocket 118 mounted on the counter shaft 65 and it will thus be seen that when the motor 51 is set in operation the same will drive the main shaft 54 which in turn will drive the shaft 65 through the chain 64 and the rotation of the shaft 65 will operate the conveyer as clearly shown in the drawings.

Attached to the bucket 90 at its upper forward corner is a suitable pulley 119 over which the flexible member 120 passes. One end of this flexible member is connected to an eye 121 attached to the forward upper end of one of the arms 94 and the opposite end of each flexible member is passed over one of the sheaves 98 and one of the sheaves 100 and then attached to and wound upon its respective drum 63. It will thus be seen that when the drum is turned in winding movement the flexible members 120 will be wound thereon thereby raising the forward end of the bucket and swinging the same about the studs 63 until the rear end of the bucket is disposed in dumping position above the conveyer 103 at which time the contents of the bucket will be emptied into the conveyer and carried rearwardly and upwardly and deposited upon the rear conveyer which will be more fully hereinafter described. In order to prevent any of the material from escaping from the conveyer 102, suitable guards are secured to the sides of the conveyer and are designated by the numeral 121 so as to form a hopper into which the material is dumped.

Passing now to the description of the rear conveyer, reference will be had particularly to Figs. 2, 4, 6 and 9. The forward end of the rear conveyer is supported on an arched frame 122, the bight portion of which is apertured as at 123 to receive the pivot bolt 124 of a U-shaped yoke 125 between the arms of which are pivotally mounted the forward ends of the side bars 126 of the rear conveyer designated generally by the numeral 127. The frame of the conveyer 127 is pivotally mounted on the bolts 128 which pass through the ends of the arms of the U-shaped frame 125 and it will thus be seen that the conveyer will be free to swing laterally and vertically. The forward ends of the side bars 126 of the conveyer 127 have mounted thereon suitable bearings in which the axle or shaft 129 is rotatably mounted, which axle forms a support for the conveyer roller 130. A suitable idler roller is provided for the under run of the conveyer at its forward end and is mounted between the arms of the frame 125 as clearly illustrated in Fig. 1. The rear ends of the side bars 126 of the conveyer 127 have attached thereto suitable plates 131 provided with slots 132 in which the bearing blocks 133 are slidably mounted. These bearing blocks form bearings for the shaft 134 on which the conveyer roller is mounted and a sprocket 135 is attached to one end of the shaft and has passing thereover the drive chain 136 by means of which the conveyer is operated. Extending forwardly from the forward sides of the blocks 133 are suitable threaded rods 137 which pass through apertured ears 138 formed integrally with the plates 131 at the extreme forward ends of the slots 132 and threaded on these rods 137 are suitable nuts 139 which engage opposite sides of the apertured ears 138 in order to hold the blocks in various adjusted positions.

In order to support the rear end of the conveyer 127, a U-shaped frame 140 is attached to the side bars 126 and this frame is provided in its bight portion with a pair of spaced threaded apertures 141 for the reception of the upper ends of the lifting screws 142, the lower ends of which are threaded into apertures 143 formed in the carriage 144 which is slidably mounted transversely of the device. Formed between the upper and lower portions of the lifting screws 142 are suitable apertured flanges 145 by means of which the screws may be turned.

The carriage 144 hereinbefore referred to comprises a transversely L-shaped body having a horizontal opening arranged therein through which the shaft 146 is extended. A crank 147 is supported on the outer end of the shaft 146 while the inner end of said shaft carries the pinion 148 which meshes with an arcuate rack 149 formed at the upper end of a curved upstanding wall 150 which is secured to the rear end of the frame 1. The upper edge of this wall provides also a support for the carriage and it will thus be seen that upon turning the crank 147 the rear end of the conveyer may be swung to one side or the other. Rotatably mounted by the side of the U-shaped frame 140 is a suitable sprocket 151 which is mounted on the shaft 152 which in turn extends through the frame and is provided with a driving gear 153 which is splined thereon and is mounted between the arms of a U-shaped yoke 154. The bight portion of this yoke has rotatably mounted therein a sleeve shaft 155 on which a gear 156 is mounted, which gear 156 meshes with the drive gear 153 so that upon rotation of the sleeve shaft 155 the shaft 152 will be driven.

The opening in the sleeve shaft 155 which is designated by the numeral 157 is preferably rectangular to receive the rectangular shaft 158, the lower end of which is journaled in a U-shaped frame 159 and carries a bevel gear 160 which meshes with the bevel gear 161 mounted on the shaft 162 which is secured in suitable bearings 163 which are secured to the wall 150. A sprocket is supported on one end of the shaft 162 and a chain 164 passes over said sprocket and is driven by a suitable sprocket on the shaft 165 of the motor 166. This motor 166 is mounted at the rear end of the frame 1 and serves to drive the rear conveyer and also propel the device about the mine or tunnel.

Mounted on the drive shaft 165 of the motor is a suitable sprocket around which the chain 167 passes which chain passes over a drive sprocket mounted on the shaft 168 having loosely mounted thereon the gears 169 and 170. Each of these gears is controlled by a clutch 171 and both gears mesh with a bevel pinion 172 mounted on one end of a shaft 173 which is mounted in suitable bearings on the upper side of the frame. A large bevel gear 174 is mounted on the shaft 173 and meshes with a pinion 175 which in turn is mounted on a shaft 176 which extends transversely of the machine and carries at its opposite end a worm 177 which meshes with the worm gear 178 which is mounted at the rear end of a shaft 179. The worm gear 178 is loosely mounted on the shaft 179 and a suitable sprocket 180 is also loosely mounted on said shaft and has passing thereover a chain 181 which passes over a sprocket 182 mounted on the shaft 173 hereinbefore described. A suitable clutch sleeve 183 is slidably mounted between the gear 178 and the sprocket 180 and is adapted to engage suitable clutch lugs carried on said gear and sprocket in order to change the speed of rotation of the shaft 179. Mounted on the forward end of the shaft 179 is a sprocket 180 over which the drive chain 185 passes which chain also passes over the drive sprocket 21 of the propelling shaft.

Figure 7:
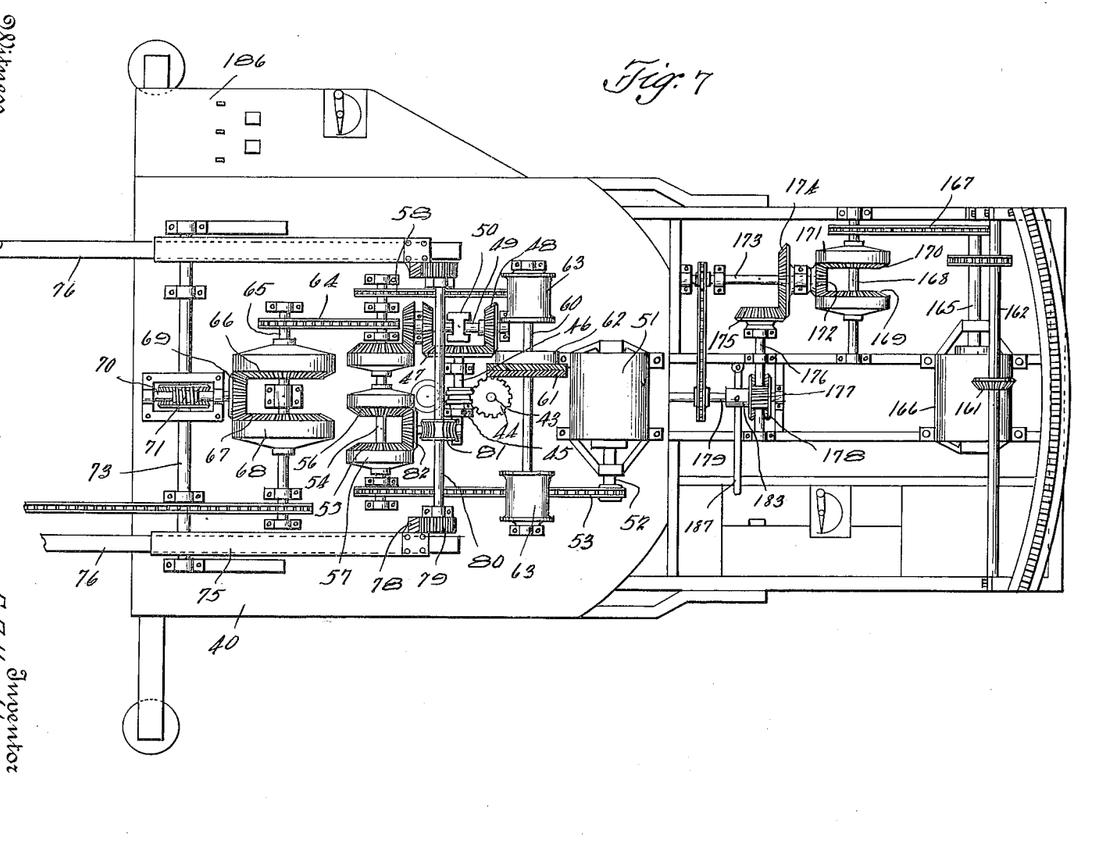
Fig. 7 is a top plan view of the truck and platform showing the conveyers removed to more clearly illustrate the driving mechanism for the various parts of the device.
Figure 8:
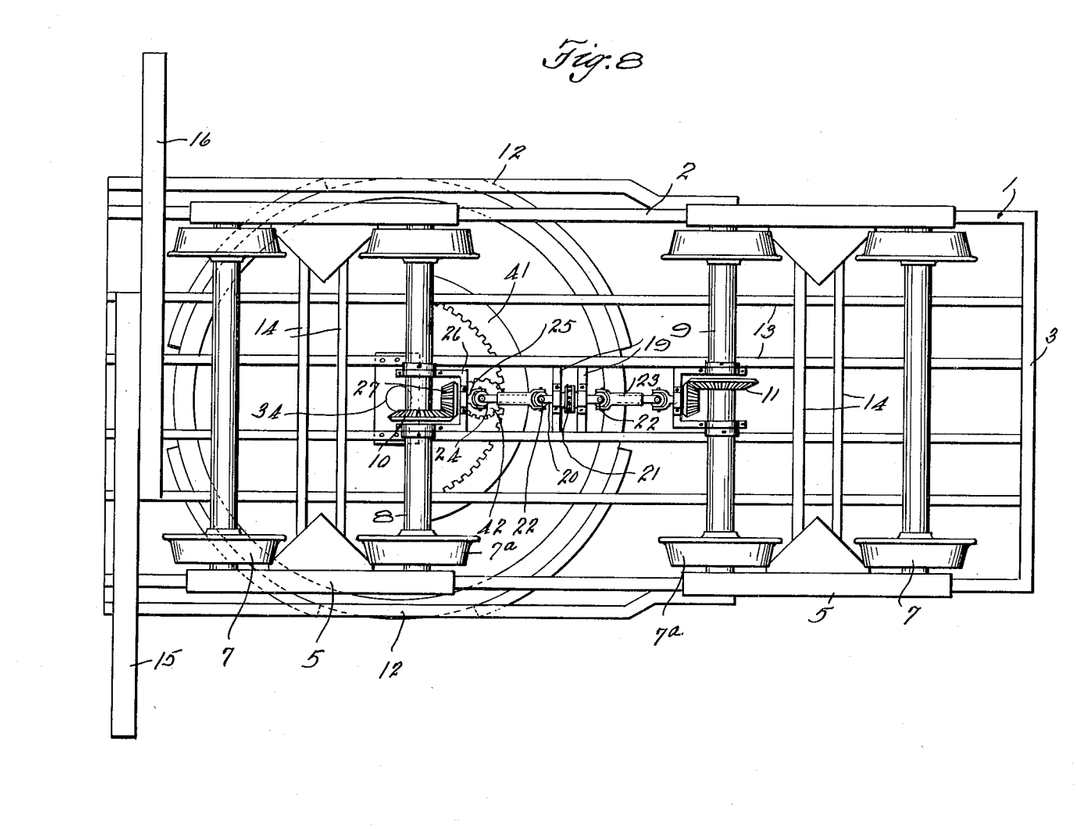
Fig. 8 is a bottom plan view of the truck illustrating the propelling mechanism for the machine.
Figure 9:
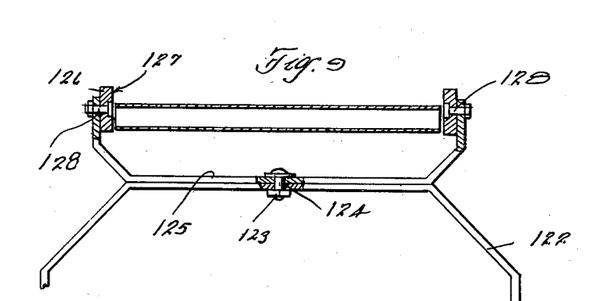
Fig. 9 is a fragmentary detail view of the forward support for the rear conveyer, showing the conveyer in section.
Figures 10, 12:
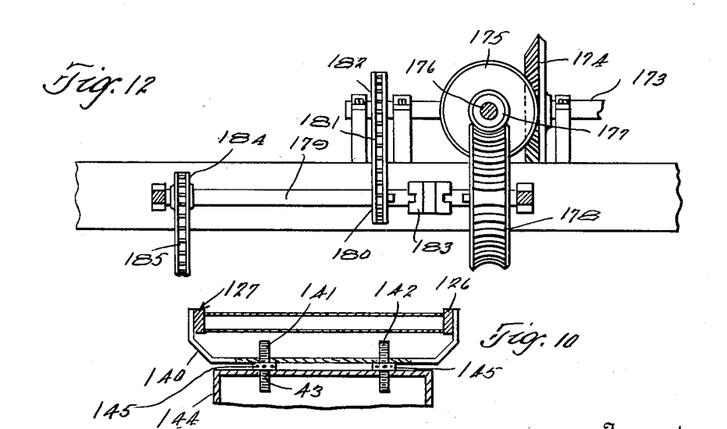
Fig. 10 is a fragmentary detail sectional view illustrating the adjustable supporting means for the rear end of the rear conveyer.

It will be understood that suitable levers and controlling means may be provided for the clutches and motors which levers are mounted on the platform 186 as will be clearly seen upon reference to Fig. 7.

In use it will be seen that the machine is moved into proper position by setting the motor 166 into operation which will transmit power to the shaft 165 thus driving the shaft 168 by means of the chain 167 and suitable sprockets mounted on the shafts. Upon operating one or the other of the clutches 171 it will be seen that the machine may be driven in a forward or reverse direction by the rotation of the shaft 173 which drives the shaft 176 through the gear 174 and pinion 175 and thereby transmits power through the worm 177 to the worm wheel 178 which is loosely mounted on the shaft 179. It will thus be seen that when the clutch sleeve 183 is moved into coöperative relation with the clutch member on the wheel 178 by means of the lever 187 the machine will be driven at a relatively low speed. However, upon moving the clutch sleeve 183 into engagement with the sprocket wheel 180 which is driven by the chain 181 which in turn is driven by a sprocket 182 mounted on the shaft 173 it will be seen that the shaft 179 will be driven at a relatively high speed thus enabling the device to move rapidly about the mine or tunnel. After the device has been properly positioned within the mine or tunnel in order that the shovel may be brought against the wall which is to be cut away, the clamps 31 are clamped on the track rails so as to firmly anchor the device in place and the beams 15 and 16 are then run out laterally and their ends are arranged with jacks positioned thereunder and it will be seen that the machine is then ready for the digging operation. It will, of course, be understood that when the clutch sleeve 83 is in neutral the machine will not be driven in either direction and of course when the clutches 171 are not in operation it will be seen that the shaft 173 will not be driven, but that the shaft 162 which is arranged to drive the conveyer will be set in motion through the operation of the motor 166. After the machine has been brought to proper position the motor 51 is set in operation thereby driving the main shaft 54 through the medium of the chain 53 and the sprocket mounted on the shaft 52 and the shaft 54 and the rotation of the shaft 54 will drive the counter shaft 65 through the medium of the chain 64 and the transversely extending shaft 59 through the medium of the chain 58. The operation of the shaft 59 will cause the herring bone gear 61 to be operated and it will be seen that upon operating the clutch member 62 the shovel may be moved to raised position by the winding of the flexible member or cables 120 on the drums 63. On the lowering and digging stroke it will be understood that the clutch 62 is used as a brake to control the speed of the lowering of the bucket and the said bucket is then let down until it engages the cross piece 82 of the boom and simultaneously with the movement of the bucket into engagement with the boom the clutch 68 of the gear 67 is operated to cause the gear 67 to rotate with the shaft 65 and thus transmit power to the pinion 69 and worm 71 which drives the shaft 73 so as to operate the pinions 24 and thus cause the same to move the arms 76 inwardly. As soon as the arms have reached their innermost limit of movement the clutch 68 of the gear 67 is thrown out of operation and the clutch 68 of the gears 66 is thrown into operation and it will be seen that the movement of the arms 76 will be reversed. Simultaneously with the reversal of the movement of the arms 76 the clutch 57 of the gear 55 is thrown into operation and it will be seen that the pinion 82 will be rotated so as to cause the worm mounted thereon to turn the worm gear 81 in order to swing the rear ends of the guides 75 upwardly and cause the arms 76 to move forwardly and downwardly thereby moving the digging fingers 93 of the bucket 90 into contact with the material which is to be removed. After the guides 75 have been moved upwardly to their uppermost limit of travel the gear 55 is thrown out of operation and the gear 56 thrown into operation and it will be seen that the direction of rotation of the shaft 80 will be reversed thus causing the pinion 79 to move the rear ends of the guides downwardly in order to cause the shovel to lift and after the guides have reached their lower limit of travel the clutch 62 is again operated to cause the drum 63 to wind the cables 120 thereon to raise the bucket and cause the same to swing in an arc around the trunnions 63 thus causing the rear end of the bucket to be moved into dumping position over the hopper 121. The movement of the bucket into dumping position over the hopper will cause the contents of said bucket to be emptied on to the conveyer 113 which is driven by means of the chain 107 passing over the sprocket 109 and the sprocket 118 which is mounted on the counter shaft 65. The driving of the conveyer will cause the material dumped thereon to be carried upwardly and rearwardly and be deposited on the rear conveyer 127 which being driven through the medium of the chain 136 will carry the material rearwardly and dump the same into a car or similar receptacle which is run on to the track immediately in the rear of the machine. In this way it will be seen that the contents of the shovel may be easily and quickly removed and carried to a distant point where it may be deposited.

Should the machine be stood upon a curve so that the car in the rear thereof would be positioned to one side of the longitudinal axis of the machine it will be seen that by turning the crank 147 the rear end of the rear conveyer may be swung laterally in order that the same may be centered over the car and should a car having high sides and ends be used it will be seen that upon turning the lifting screws 142 the rear end of the rear conveyer may be raised or lowered to suit the requirements.

While in the foregoing there has been shown and described the preferred embodiment of this invention, it is to be understood that such changes may be made in the combination and arrangement of parts as will fall within the spirit and scope of the invention as claimed.

What is claimed is:—

1. In a mining machine, a frame, a pair of guides mounted near the forward end of the frame, the forward ends of said guides being pivotally mounted on a horizontal pivot, an arcuate rack bar at the rear ends of said guides, arms slidable in the guides, means to move the arms forwardly and rearwardly, a shovel mounted on said arms and means meshing with the arcuate rack bar at the rear ends of the guides to raise and lower the same simultaneously with the forward movement of the arms to cause said shovel to have a digging action and means to dump said shovel, substantially as set forth.

2. In a mining machine, a frame, guides pivotally mounted at the forward end of the frame, arms slidable in the guides, means to raise and lower the rear ends of the guides, a shovel supported at the forward ends of the arms, flexible members connected to the shovel to move the same upwardly into dumping position, racks and pinions for moving the arms and shovel forwardly when the rear ends of the guides are raised and a conveyer to receive the contents of the shovel when the same is raised to dumping position, substantially as set forth.

3. In a mining machine, a frame, guides pivotally mounted at the forward portion of the frame and adapted to swing upwardly in a vertical plane, arcuate rack bars at the rear ends of the guides, pinions meshing with said rack bars to move the rear ends of said guides upwardly and downwardly, arms slidable in the guides, rack bars carried by the arms, pinions mounted on the pivots of the guides meshing with the rack bars on the arms for moving said arms inwardly and outwardly, a bar connecting the forward ends of the arms, studs extending outwardly from the arms, a shovel pivoted to the studs and resting on the bar and flexible members connected to the shovel and adapted to move said shovel into dumping position, substantially as set forth.

4. In a device of the class described, a frame, a platform rotatably mounted on said frame, a shaft rotatably mounted at the forward end of the platform and extending transversely of the frame, guides pivotally mounted on said shaft and adapted to swing in a vertical plane, rack bars at the rear ends of the guides, pinions mounted on the platform and meshing with the rack bars, arms slidable in the guides, pinions on the ends of the first mentioned shaft, rack bars within the arms and meshing with the last named pinions, a cross bar connecting the forward ends of the arms, trunnions extending outwardly from the arms near their forward ends, a bucket, rearwardly extending supporting arms secured to the bucket, the ends of the arms being pivoted to the trunnions, upwardly and forwardly extending arms secured to the platform, sheaves carried by the last named arms, flexible members passing over the sheaves, sheaves carried by the bucket and forming guides for the flexible members, one end of said flexible members being attached to the upwardly and forwardly extending arms of the platform and drums mounted on the platform and having the opposite ends of the flexible members connected thereto whereby when the drums are rotated the bucket will be moved to dumping position, substantially as set forth.

5. In a mining machine, a frame, a pair of guide members mounted in the forward end of the frame, means pivotally securing the guide members to the frame for movement in a vertical plane, forwardly extending arms slidably mounted in the guides, an inclined conveyer arranged above and between the arms, outwardly extending trunnions carried by the arms adjacent to the forward ends thereof, supporting arms pivotally secured at their rear ends to the trunnions, a shovel rigidly carried by the forward ends of the supporting arms, means to swing the guides on the pivot, means mounted in the guides for moving the arms forwardly and rearwardly, and means for swinging the supporting arms on the trunnions above the conveyer, substantially as set forth.

In testimony whereof I affix my signature in presence of two witnesses.

EMIL A. HURTLEY.

Witnesses:
August Allen,
Jafet Rytkonen.

Copies of this patent may be obtained for five cents each, by addressing the "Commissioner of Patents, Washington, D. C."